Sept. 18, 1945.　　　　　R. J. SMITH　　　　　2,385,308
HEATING RATE CONTROLLER
Filed Sept. 28, 1944　　　4 Sheets-Sheet 2

INVENTOR.
RUSSELL J. SMITH
BY
Barnes, Kisselle, Laughlin & Raisch
ATTORNEYS

Sept. 18, 1945. R. J. SMITH 2,385,308
HEATING RATE CONTROLLER
Filed Sept. 28, 1944 4 Sheets-Sheet 4

INVENTOR.
RUSSELL J. SMITH
BY
Barnes, Kisselle, Laughlin & Raisch
ATTORNEYS

Patented Sept. 18, 1945

2,385,308

UNITED STATES PATENT OFFICE 2,385,308

HEATING RATE CONTROLLER

Russell J. Smith, Houghton, Mich.

Application September 28, 1944, Serial No. 556,155

5 Claims. (Cl. 219—20)

This invention relates to a constant heating rate controller.

It is the object of this invention to produce a constant heating rate controller which will accurately control the heating and/or cooling rate of an electrical furnace.

Figure 1:
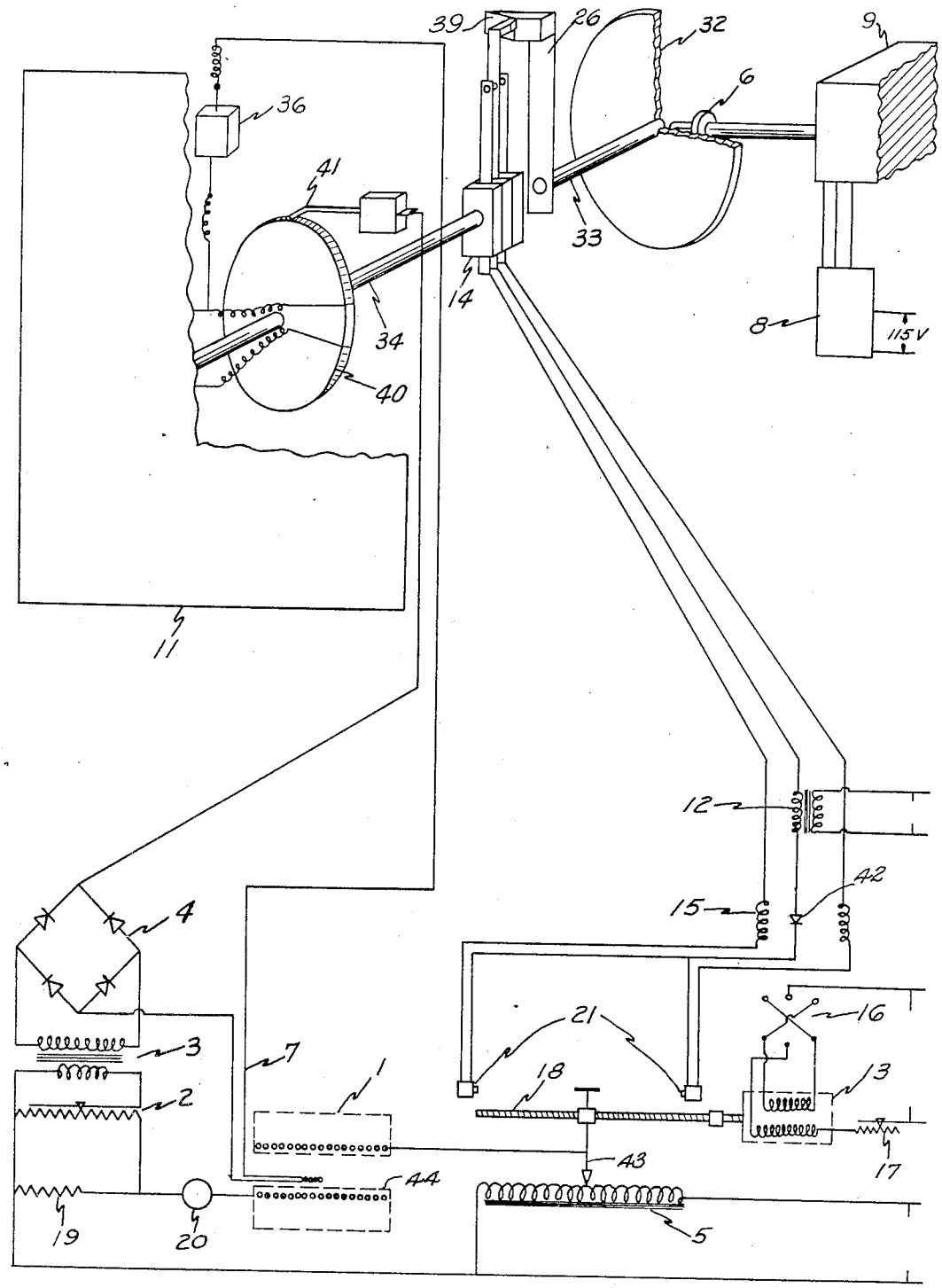
Fig. 1 is a circuit diagram of a heating rate controller incorporating an altered automatic potentiometric pyrometer.

The elements in all of the figures are referenced as follows: electric resistance furnace 1, shunt 2, step-up transformer 3, full wave bridge rectifier 4, autotransformer 5, clutch wheel 6, thermocouple, Chromel-Alumel or other couple with substantially lineal E. M. F.-temperature relationship 7, SP (single pole)-DT (double throw) reversing or limiting relay switch 8, gear reduced synchronous motor 9, potentiometric indicating, recording and controlling pyrometer 11, step-down relay transformer 12, series reversing motor 13, relay switch 14, relay coils 15, SP (single pole)-DT (double throw) switch operated from relay coils 16, resistor 17, screw 18, main power line shunt 19, ammeter 20, limit switches, normally closed, 21, worm-rotated contact arm upon which are mounted H (high)-C (common), L (low)-C (common) and the release contacts for neutral position 22, synchronous motor and cam for operating chopper bar 23, SP (single pole)-DT (double throw) mechanical latch relay switch for operating H (high)-C (common)-L (low) of relay coils 15, 24, temperature scale, 0 to 1200° C., 25, contactor arm 26 fixed on shaft 33, chopper bar 27, pick-up coils (low temperature) 28, pick-up coils (high temperature) 29, low temperature relay contacts 30, high temperature relay contacts 31, clutch plate 32, shaft 33, controller shaft 34, metal flag 35, galvanometer needle 36, resistance circuit 37, resistance element 38, cam face 39, potentiometer slide wire 40, potentiometer slide wire contact 41, half wave rectifier 42, slide contactor of autotransformer 43, refractory muffle or core 44, millivoltmeter needle 45, worm gears for rotating contact arm 46, altered millivoltmeter control pyrometer 47, stops for limiting the angular movement of the millivoltmeter needle within the limits of the control elements 48, center tapped step up transformer 49, full wave-center tap rectifier 50, lead storage battery, 2 volt, 51, standard resistance 52, milliammeter 53, slide resistor for adjusting potential drop across standard resistance 54, low temperature contacts 55, neutral contacts 56, high temperature contacts 57, low temperature coil and contact 58, neutral unlocking coil 59, high temperature coil and contact 60.

My method for the control of heating and cooling rate of electrically heated furnaces is based upon the principle of the bias action of a rectified power line bias (for anticipation of power change) superimposed upon the thermocouple potential to the controlling pyrometer. Either millivoltmeter, potentiometer or Wheatstone bridge pyrometric equipment may be used to control power controlling element such as resistors or auto-transformers.

The electrical circuit used in the potentiometric method is shown in Fig. 1. The operation of this apparatus for a heating curve is as follows:

Knowing the approximate full load wattage of the furnace 1, the shunt 2 to the A. C. primary of the rectifier transformer 3 is set to supply about 12 millivolts from the rectifier 4 at the above wattage. (This resistor has previously been calibrated in watts, so that the adjustment is merely a matter of an initial setting.) The contactor 43 of the auto-transformer 5 is then set to the lower voltage end. The clutch wheel 6 is moved closer to or further from the center of the clutch plate 32, depending on the heating rate desired. This clutch plate 32 likewise has previously been calibrated for heating rate in degrees per minute, so that only an initial adjustment of the position of clutch wheel 6 is necessary; in this instrument this calibration is for a Chromel-Alumel couple 7. The reversing switch 8 is now turned on and adjusted to cause the gear-reduced synchronous motor 9 to rotate the clutch wheel 6 in the proper direction for heating.

The controller 11, the relay transformer 12, the series reversing motor 13 and the power to the auto-transformer 5 are turned on. The contactor arm 26 of clutch plate 6 is now adjusted to neutral position on relay switch 14. Thence forward the operation is automatic.

As the contactor arm 26 of the clutch plate 6 is rotated at the desired rate, the low and common contacts of relay switch 14 make contact, energizing one of the relay coils 15. This coil in turn closes the single-pole, double-throw switch shown at 16 and thus energizes the motor 13 (whose speed is governed by the resistor 17). The motor, acting through the screw 18, moves the contactor 43 of the auto-transformer 5 to the right and higher voltages where the potential supplied by the rectifier 4 plus the thermocouple 7 causes a potential unbalance in the potentiometer controller 11 which in automatically rebalancing causes the controller shaft 34 to rotate, thus restoring the neutral position of the relay switch 14. As the thermocouple 7—which is usually placed against the side of the muffle or core 44 for convenience of research operation and sensitivity of control—begins to heat, it supplies added potential thus unbalancing the potentiometer controller 11 which in rebalancing causes the controller shaft 34 to move so that the high and common contacts of the relay switch 14 are shorted, thus reversing the motor 13 and decreasing the power to the furnace 1 to such a value that the neutral position of the relay switch 14 is again established. Motor 9 is geared down so that it turns the clutch plate 32 about 350 circular degrees in twenty-four hours at the slowest speed position for clutch wheel 6. It is then the purpose of the potentiometer controller 11 to cause the switch 14 to follow the clutch plate arm 26. If the switch 14 lags behind the clutch arm 26, the low and common of switch 14 is made and the motor 13 increases the power to the furnace, thus increasing the bias and causing the potentiometer controller 11 to move the switch 14 up to neutral position again. Then when the thermocouple 7 gets hotter the reverse action occurs, namely, the switch 14 overruns the contactor arm 26 so that the cam face 39 closes the high and common contacts of switch 14 and the motor 13 decreases the power to the furnace thus decreasing the bias and causing the potentiometer control to move the switch 14 back to neutral position again. Contacts of switch 14 are only made when the potentiometer controller causes switch 14 to lag behind or advance in front of clutch arm 26. Line voltage variations are similarly compensated for, the sensitive element being the combined shunts 2 and 19, transformer 3, and rectifier 4 assembly, whose immediate response affects the controller 11 which, through the relay system, corrects for the variation before the thermocouple is affected. The ammeter 20 is a valuable aid in adjusting the apparatus when starting from mid-temperature ranges or when starting with a furnace whose characteristics are unknown.

For changing the heating rate during a run, adjusting of the clutch wheel 6 to faster or slower position is all that is necessary.

When the temperature limit of the run is reached, motor 9 is reversed manually by the reversing switch 8. If the amperage change to the furnace in this operation is large, the position of the auto-transformer contactor 43 is manually shifted to the left to give lower voltage, thus aiding the series motor 13 to establish neutral position of the relay switch 14 sooner. When the auto-transformer 5 assumes zero potential position the cooling rate can no longer be maintained unless artificial cooling mechanisms are incorporated.

For constant temperature control the furnace 1 is brought up to temperature and the clutch wheel plate 32 adjusted to neutral position of relay switch 14; however, for this operation the synchronous motor 9 is not operated. The advantage of this type of constant temperature control is that the furnace is operated on a bias controlled amperage supply as demanded by the thermocouple-rectifier combination.

The normally closed limit switches 21 are used to stop the motor 13 when the zero and 115-volt limits of the auto-transformer are reached.

Figure 2:
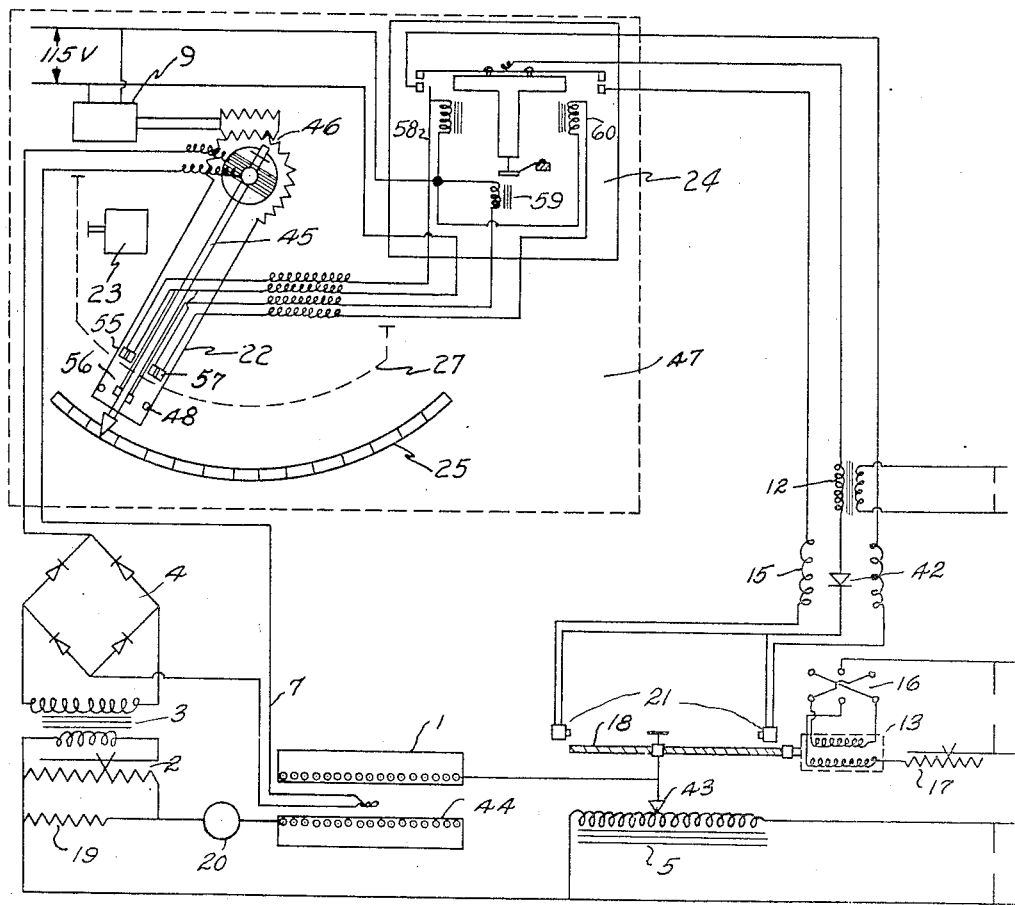
Fig. 2 is a circuit diagram of a heating rate controller incorporating mechanically operated millivoltmeter pyrometer.

Similarly, Fig. 2 is a circuit diagram of an apparatus using a mechanically operated millivoltmeter instrument as the controlling device. The low, neutral and high sets of contacts of the contact arm 22 are actuated by the periodic action of the cam of the synchronous motor 23 on a chopper bar 27 which depresses the millivoltmeter needle 45 on either of three sets of contacts. The steady increase or decrease of temperature is accomplished by rotating the contactor arm 22 at the desired rate by the synchronous motor 9 acting through a gear reduction. The operation of this apparatus is as follows: Knowing the approximate full load wattage of the furnace 1, the shunt 2 to the A. C. primary of the rectifier transformer 3 is set to supply about 12 millivolts from the rectifier 4 at the above wattage. The contactor 43 of the autotransformer 5 is then set to the lower voltage end. The gear reduction in motor 9 is chosen to give a rate of angular movement of contact arm 22 to accomplish a desired heating rate. The contact arm 22 is initially adjusted to furnace 1 temperature—namely room temperature. The 115 volt power to the synchronous motor 9, synchronous motor 23, relay 24, relay transformer 12, series motor 13 and auto-transformer 5 is turned on.

As contact arm 22 rotates to higher temperature position, motor 23, periodically depressing chopper bar 27, causes millivoltmeter needle 45 to close low temperature contacts 55, thus energizing the low temperature contact coil 58 of relay switch 24, which in turn energizes one of the relay coils 15, thus actuating switch 16, and thus energizing series motor 13. Motor 13 acting through screw 18 moves the slide contactor 43 of transformer 5 to higher voltages where the potential supplied by the rectifier 4 plus thermocouple 7 causes the millivoltmeter needle 45 to move over neutral contacts 56 which are closed by the periodic action of the chopper bar 27. As neutral contacts 56 energize neutral coil 59, low temperature contacts 58 are opened, thus de-energizing relay coils 15, opening switch 16 and stopping motor 13.

As furnace 1 begins to heat the increasing potential of thermocouple 7 plus rectifier 4 causes millivoltmeter needle 45 to move over high temperature contacts 57, which are closed by the action of chopper bar 27. Contacts 57 energize coil and contacts 60, which in turn energize the high temperature coil of coils 15 thus actuating switch 16 to reverse the direction of motor 13, which acting through screw 18 moves the slide contactor 43 to lower voltages, thus decreasing the potential supplied by rectifier 4. This causes the millivoltmeter needle to move back over neutral contacts 56, which are closed by the action of chopper bar 27, thus energizing neutral coil 59, opening contact 60, de-energizing the high temperature coil of coils 15, opening switch 16 and thus stopping motor 13. Contacts 55 and 57 are only actuated when the millivoltmeter temperature needle 45 lags behind or advances before the neutral position of neutral contact 56.

When the temperature limit of the run is reached the motor 9 is reversed and as contact arm 22 revolves to lower temperature the action of millivoltmeter needle 45 on contacts 55 and 57 actuate relays 24 and 15 to cause series motor 13 to adjust the power from auto-transformer 5 to furnace 1 so that the combined potential supplied by thermocouple 7 and rectifier 4 will cause the millivoltmeter needle 45 to follow neutral position of contact arm 22.

Heating and cooling rates are governed by the choice of gear reduction in motor 9.

Constant temperature control is attained by setting the contact arm 22 at the desired temperature, and actuating all elements of the apparatus except the motor 9, which is not operated.

Figure 3:
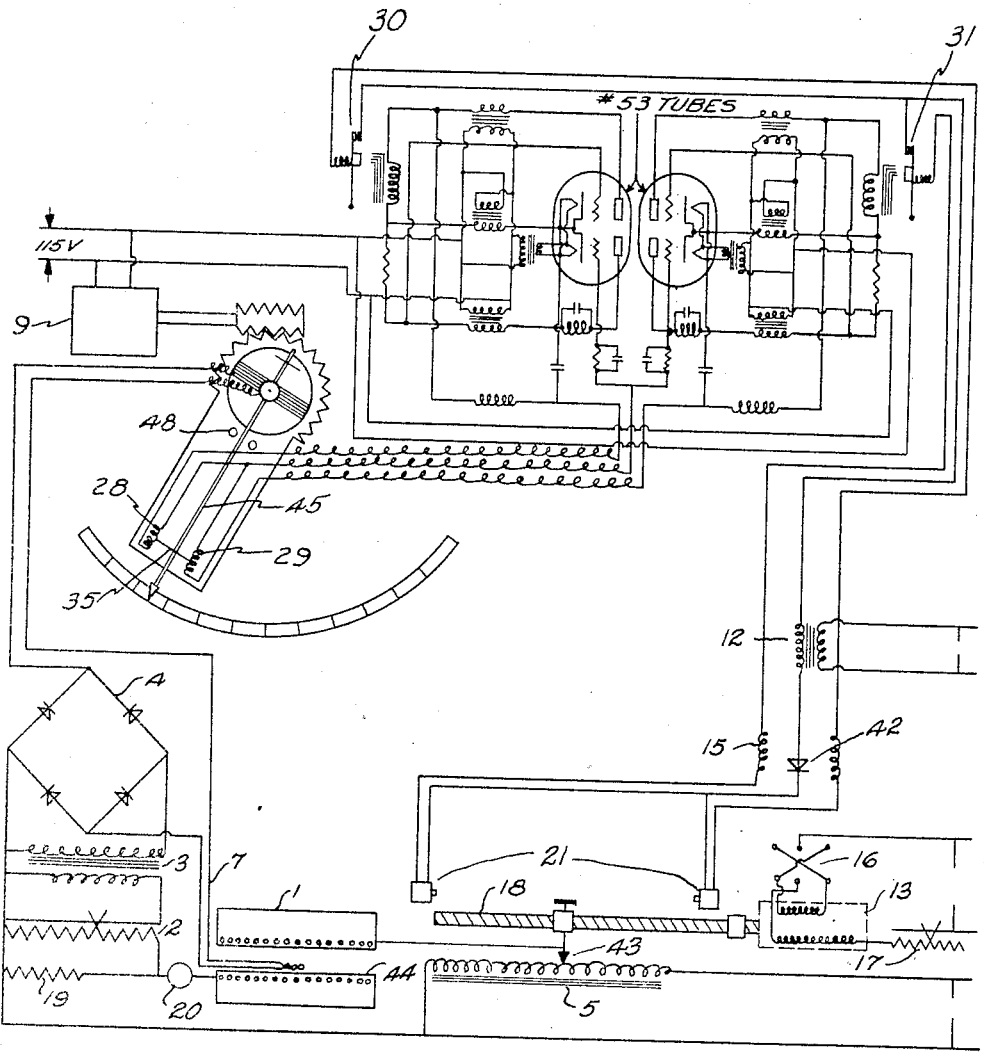
Fig. 3 is a circuit diagram of a heating rate controller incorporating millivoltmeter pyrometer of the capacitance control type.

Figure 3 represents a circuit diagram of a similar apparatus incorporating a millivoltmeter instrument of the capacitance control type as the controlling mechanism. (For detailed explanation of the capacitance control principle, reference may be made to the prior art United States Patent No. 2,228,163.) In this instrument, the movement of the metal flag 35, which is suspended on the millivoltmeter needle 45, between the set of low temperature pick-up coils 28 or between the high temperature pick-up coils 29, changes the grid bias of the #53 tube in either the low temperature or the high temperature capacitance circuit so that the respective relay 30 or 31 is closed thus energizing either the low or high temperature coil of relay 15, which in turn operates the SP (single pole)-DT (double throw) relay 16, thus starting the motor 13, which, acting through the screw 18, adjusts the output voltage of the auto-transformer 5. The manipulation of this apparatus is practically identical with that of the mechanical millivoltmeter apparatus, Fig. 2, previously described. The action of the rectifier-bias assembly in conjunction with this type of controller is the same as that described for the potentiometric apparatus, Fig. 1, and for the mechanical millivoltmeter apparatus Fig. 2. The desired heating or cooling rate is attained by rotating the contact arm 22 at the desired speed by the synchronous motor 9 acting through a gear reduction.

For constant temperature control, or constant temperature change control, the rectifier bias principle may also be used in conjunction with resistance thermometers, thermopiles, or any other devices which gives almost lineal electrical variation with temperature.

All three of the instruments illustrated are based on the same fundamental principle—namely, the smooth control of power by the bias action of the rectifier of the rectifier-thermocouple assembly. A brief study of the circuits of Figs. 2 and 3 will show their similarity.

In my working model the only wires attached to the instrument cabinet are the flexible cord from the power socket, the flexible extension leads to the couple of the furnace, and the leads carrying the controlled power to the furnace.

The following advantages reside in the thermocouple-rectifier bias principle for control of heating and cooling rate:

1. Either converted potentiometric or millivoltmeter instruments may be used for the controller.

2. Smooth control of temperature change results from the immediate response to power change of the shunt-rectifier of the rectifier-thermocouple combination. Speed control of the reversing motor governs the sensitivity of response; however, too much speed tends to cause over-shooting and thus to cause continuous searching.

3. The thermocouple may be inserted at any convenient place in the hotter part of the furnace, preferably against the core wall.

4. Changes in the heat capacity of the load for different heats are automatically compensated for.

5. Any furnace within the power capacity of the auto-transformer may be employed without previous calibration.

6. Rate of temperature change may be varied during a run by a simple clutch wheel or gear ratio adjustment.

7. The instrument can hold temperature steady within the temperature range of the controller.

Figure 4:
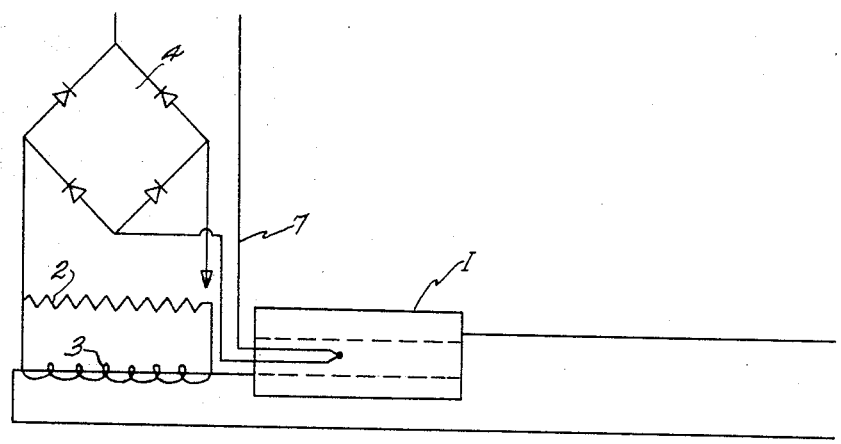
Fig. 4 is a modified form of the circuit diagram shown in Fig. 1 showing another way of obtaining a bias potential from a power line by the use of a single phase full wave bridge rectifier.
Figure 5:
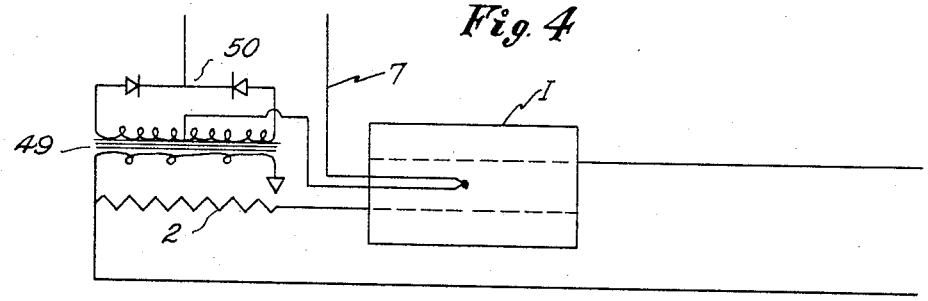
Fig. 5 is a modified form of the circuit diagram shown in Fig. 1 showing another way of obtaining a bias potential from a power line by the use of a single phase full wave center tapped rectifier.
Figure 6:
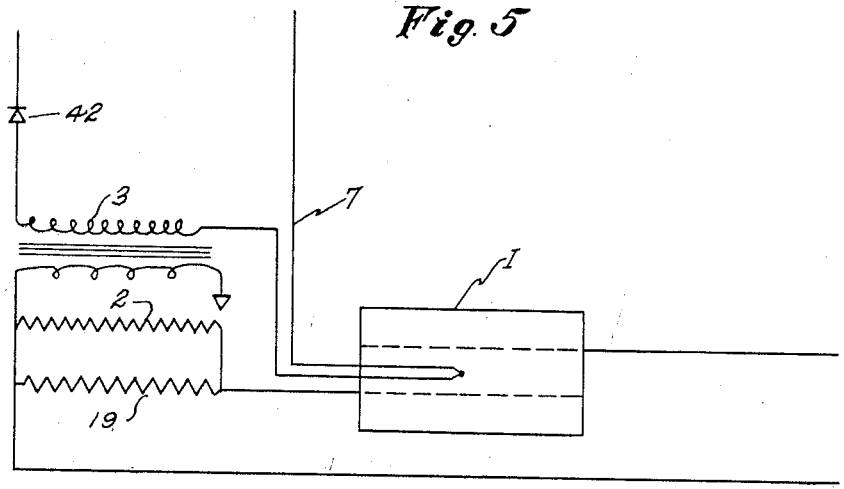
Fig. 6 is a modified form of the circuit diagram shown in Fig. 1 showing another way of obtaining a bias potential from a power line by the use of a single phase half wave rectifier.

There are many ways of obtaining a bias potential from a power line. For purposes of illustration I have shown in Figs. 4, 5 and 6 three more bias circuits which can be substituted for the full wave bridge rectifier 4, transformer 3, shunts 2 and 19, in Figs. 1, 2 or 3. In Fig. 4 I have shown a single phase full wave bridge rectifier; in Fig. 5 a single phase full wave center tapped rectifier; and in Fig. 6 a single phase half wave rectifier.

Figure 8:
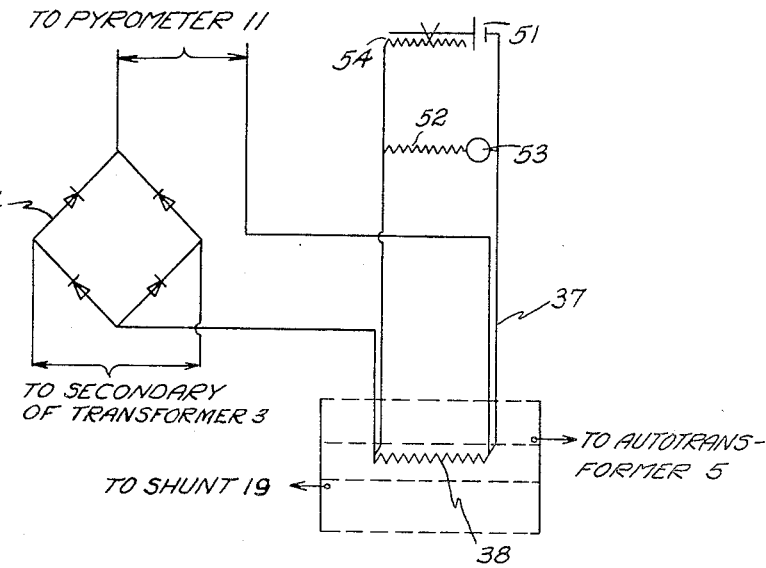
Fig. 8 is a modified form of the circuit diagram shown in Fig. 1 wherein a platinum temperature measuring resistor is substituted for the thermocouple.
Figure 7:
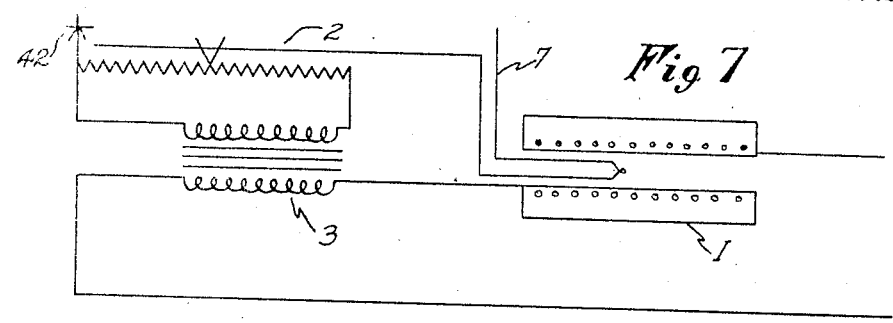
Fig. 7 shows another modification of the circuit diagram of Fig. 1 wherein the positions of the shunt and transformer are reversed.

In Fig. 7 I have shown a modification of the circuit diagram of Fig. 1. The modification consists in reversing the position of the shunt 2 and the transformer 3. In Fig. 8 I have shown a circuit diagram wherein a resistance circuit 37 is substituted for the thermocouple 7 in the circuit illustrated in Fig. 1. Adjustment of resistor 54 controls the milliamperage through standard resistance 52. Increase in the resistance of resistance element 38 causes an increase in potential drop thereon, which added to the bias potential from rectifier 4 is sent to the pyrometer for the control of temperature. Pyrometer instruments used in conjunction with a temperature resistance element must have a suppressed zero to compensate for the potential due to the normal room temperature resistance of resistance element 38. The resistance element 38 for temperature measurement should have almost linear resistance-temperature characteristics.

I claim:

1. A temperature controller for an electrical heating system comprising electrical heating means in circuit with a source of alternating electromotive force of variable potential, electrically controlled means for varying the potential of said electromotive force to vary the heating influence, another electrical circuit in heating relation with said electrical heating means so that the electromotive force of said second circuit varies directly with the temperature change created by said electrical heating means, electrical pyrometer control mechanism for said electrically controlled means, means for rectifying a portion of the electromotive force in said heating circuit and superimposing said supplementary electromotive force upon the electromotive force in said second circuit, and means for introducing the electromotive force of the said second circuit and the supplementary electromotive force from the rectifying means into the pyrometer control circuit for the purpose of actuating said pyrometer control mechanism to anticipate control conditions and maintain a substantially constant rate of temperature change.

2. A temperature controller for an electrical heating system comprising electrical heating means in circuit with a source of alternating electromotive force of variable potential, electrically controlled means for varying the potential of said electromotive force to vary the heating influence, a thermocouple in heating relation with said electrical heating means, electrical pyrometer control mechanism for said electrically controlled means, means for rectifying a portion of the electromotive force in said heating circuit and superimposing said supplementary electromotive force upon the electromotive force in said thermocouple circuit, and means for introducing the electromotive force of the said thermocouple circuit and the supplementary electromotive force from the rectifying means into the pyrometer control circuit for the purpose of actuating said pyrometer control mechanism to anticipate control conditions and maintain a substantially constant rate of temperature change.

3. A temperature controller for an electrical heating system comprising electrical heating means in circuit with a source of alternating electromotive force of variable potential, electrically controlled means for varying the potential of said electromotive force to vary the heating influence, a thermocouple in heating relation with said electrical heating means, electrical pyrometer control mechanism for said electrically controlled means, a shunt connected into the heating circuit, means for rectifying the electromotive force in said shunt and superimposing said rectified supplementary electromotive force upon the electromotive force in said pyrometer circuit, and means for introducing the electromotive force of the said thermocouple circuit and the supplementary electromotive force from the rectifying means into the pyrometer control circuit for the purpose of actuating said pyrometer control mechanism to anticipate control conditions and maintain a substantially constant rate of temperature change.

4. A temperature controller for an electrical furnace including an electrical resistance heating element in circuit with a source of alternating electrical current, electrical controlled means for varying the potential in said heating circuit, an electrical circuit in heating relation with said furnace so that the electromotive force of said second electrical circuit varies directly with the temperature change created by the furnace heating element, an electrical pyrometer control mechanism and circuit for controlling the operation of the aforementioned electrical controlled means for varying the potential in the main heating circuit, means for rectifying a portion of the electromotive force in the main heating circuit and superimposing said supplementary rectified electromotive force upon the electromotive force in said second circuit, and means for introducing the electromotive force of the second circuit and the supplementary electromotive force from the rectifying means into the pyrometer control circuit for the purpose of actuating said pyrometer control mechanism to anticipate control conditions and vary the potential in the main heating circuit to maintain a substantially constant rate of temperature change.

5. In a method for controlling the heating rate of an alternating current electrical heating circuit the steps comprising rectifying a portion of the electromotive force in the heating circuit and superimposing said rectified electromotive force upon a thermocouple circuit in heating influence relation with the said electrical heating circuit and utilizing both the rectified electromotive force and the electromotive force of said thermocouple circuit to control the electromotive force in the said electrical heating circuit.

RUSSELL J. SMITH.